Sept. 10, 1968   B. E. GREENFIELD   3,401,090
CONICAL FRACTIONATION APPARATUS
Filed Oct. 28, 1966

INVENTOR
B. E. GREENFIELD
BY Young & Quigg
ATTORNEYS

United States Patent Office 3,401,090
Patented Sept. 10, 1968

3,401,090
CONICAL FRACTIONATION APPARATUS
Bill E. Greenfield, Bartlesville, Okla., assignor to Phillips Petroleum Company, a corporation of Delaware
Filed Oct. 28, 1966, Ser. No. 590,362
1 Claim. (Cl. 202—158)

ABSTRACT OF THE DISCLOSURE

A fractionation column having a lower section which is cylindrical and an upper section in the shape of a truncated cone. Some of the downcomer conduits in said upper section route a portion of the downward-flowing fluid parallel to the inclined walls of the upper conical section. The diameter of the upper section and the trays therein progressively decrease in the upward direction.

This invention relates to an apparatus for fluid processing through a plurality of fluid contacting means.

The effective separation of fluids is a requirement in many processes. Certain fluid separations require alteration of the tray area throughout certain extents of the separation vessel, as a result of the departure from ideal solution characteristics of the components being separated. Prior art responds to the problem of altering tray area due to non-ideal solution phenomenon by creating a separation vessel consisting of two or more cylindrical sections, the upper cylindrical sections being of smaller diameter than the lower. This rather crude attempt to produce a separation vessel consistent with actual requirements resulted in increased costs of construction, increased difficulty of component separation, and decreased plate efficiency.

The desired objective of providing a separation vessel containing tray areas consistent with theoretical calculations has been fully achieved in my invention. Accordingly, one embodiment of my invention comprises a generally conical fractionation vessel containing ordinary parallel trays, of continually and proportionally decreasing diameter.

Accordingly, an object of my invention is to provide a means whereby vapor-liquid separation or liquid-liquid separation may be conducted, either through the medium of trays or packing.

Another object of my invention is to reduce fluid separation input energy requirement by providing a fluid contact means more consistent with theoretical requirements.

Another object of my invention is to provide a process housing equipment which can be fabricated more inexpensively.

Another object of my invention is to increase the efficiency of fluid separation by providing a fluid contact separation means more consistent with theoretical requirements.

Other objects, advantages, and features of my invention will be readily apparent to those skilled in the art by the following description, drawing, and appended claim.

Figure 1:
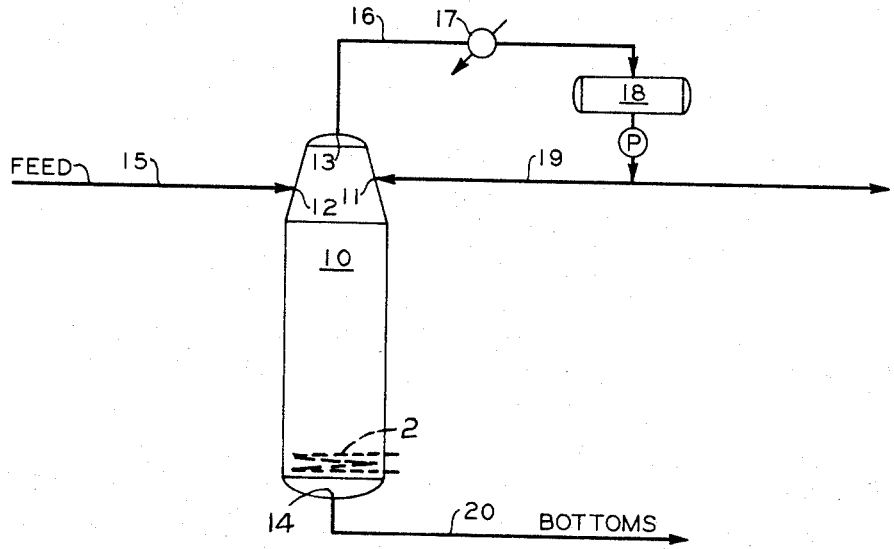
Figure 2:
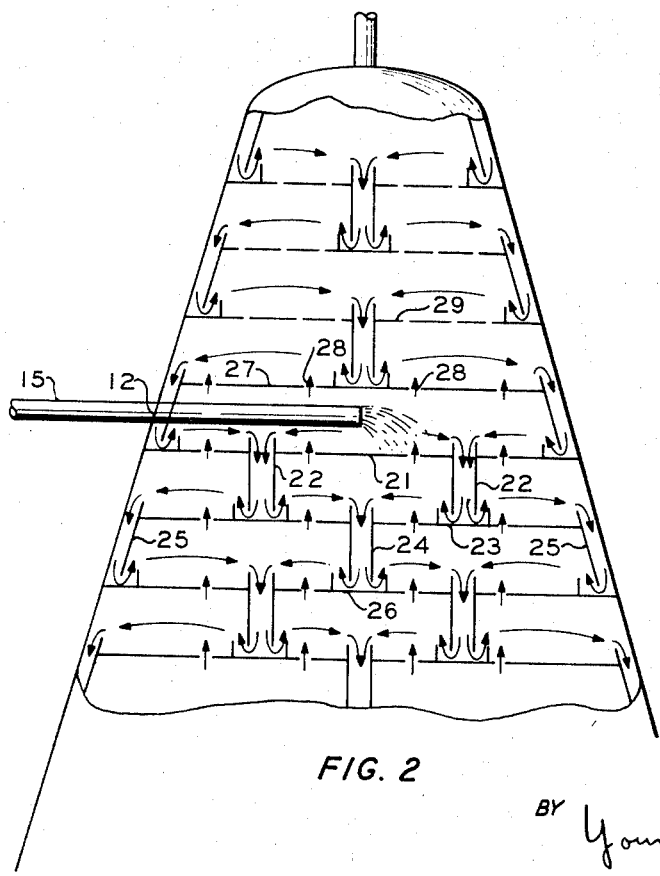

FIGURE 1 represents an elevation view in cross-section indicating fractional distillation application of the invention wherein the upper portion of the distillation column incorporates the invention. FIGURE 2 is an elevation view in cross-section of the invention as incorporated into the fractional distillation tower shown in FIGURE 1.

The operation of my invention will be hereafter described and applied to vapor-liquid fluid separation on trays; however, my invention is also applicable to liquid-liquid separation, as well as vapor-liquid separation; and also applicable to packed vessels, as well as vessels utilizing trays.

Referring to FIGURE 1, there is an illustrated vessel 10 having inlet means 11 and 12, vapor outlet means 13, a bottoms outlet means 14. A conventional reboiler 2, as shown in U.S. Patent 2,070,100 at 43 is provided in the bottom of vessel 10. In connection with inlet means 12 is a conduit means 15 thereby conducting a fluid through inlet means 12 and discharging said fluid on a horizontal vapor-liquid contact tray means wherein further separations are effected through additional horizontal vapor-liquid tray means. The vapor product of the multi-liquid vapor tray contact means is conducted overhead through vapor outlet means 13 through conduit means 16, condensed in means 17, accumulated in vessel means 18, refluxed as required in conduit means 19, and returned to the process via inlet means 11. The bottoms product of the multi-vapor-liquid separation is conducted through outlet means 14, through conduit means 20, and removed from the process.

Referring to FIGURE 2, and noting it specifically indicates that portion of the fractional distillation column in FIGURE 1 wherein the invention is located, the fluid is transported in conduit means 15 through inlet means 12 and discharged upon tray means 21. Liquid over-flow from tray means 21 in conducted vertically through conduit means 22 onto tray means 23. Liquid over-flow from tray means 23 is conducted through conduit means 24 and conduit means 25 onto tray means 26. It is of significance in this process that conduit means 25 forces the descending liquid to flow in a manner parallel to the distillation tower walls, as opposed to permitting the descending liquid to fall vertically, thus preserving much needed cross-sectional contact area on tray means 26. The descending liquid is further processed by identically functioning apparatus as has been herein described. The vapor product of the multi-tray separation is conducted vertically through tray means 27 via hole means 28. It is of significance in this process that the rising vapor can be contacted with the descending liquid by use of simple holes as described in this process or other means commonly employed in process units such as bubble caps or valves. The rising vapor is further passed through the multi-tray means and subsequently withdrawn from the process through outlet means 13 via conduit means 16 and refluxed as more particularly described heretofore.

It is of significance to note that this invention permits efficient vapor-liquid contact by the medium of altering the descending liquid conduit means as demanded by the practical requirement of tray fabrication. This alteration can be noted clearly by the descending fluid conduit means from tray means 21 to tray means 23 and the descending fluid conduit means from tray means 29 to tray means 27.

Although not herein illustrated, it is within the scope of this invention to provide for liquid-liquid extractions with integral raffinate and extract fractions. The departure from ideal solution characteristics of components subjected to liquid-liquid extraction makes the conical design equally applicable to liquid-liquid separation as to vapor-liquid extraction.

Although not herein illustrated, it is within the scope of this invention to provide vapor-liquid separation or liquid-liquid separation, not through the medium of trays, but through the medium of a high surface area to volume material generically known as packing.

This invention is thus broadly applicable to the separation of fluids.

The following are specific embodiments of the invention:

(1) A feed of 4 million gallons per day (g.p.d.) comprising approximately 3½ million g.p.d. adsorption medium with an average molecular weight of 110 and generally consisting of hexane and octane paraffins and approximately ½ million g.p.d. of adsorbed paraffin hydrocarbon comprising approximately (by weight) 50 percent $C_2$, 25 percent $C_3$, 12 percent $C_4$, 13 percent $C_5$, and traces of heptane and higher, is introduced onto the thirty-second tray of a fractionation tower containing 37 actual trays, operating at 200 p.s.i.g., and having a bottom temperature of 470° F. and a top temperature of 95° F. produced by hot oil reboiler coils, and requiring 410 g.p.m. reflux; wherein a lean oil bottoms product and a vapor product is produced. The top diameter of the conical section is 10 feet, while the bottom diameter is 22 feet; the vertical distance between the top and bottom diameters is 38 feet. The conical section is atop a cylindrical section 60 feet in height and 22 feet in diameter. Of the 37 trays in the tower 15 are located in the upper cylindrical section, while 22 are located in the lower cylindrical section. Input energy is supplied by a hot oil reboiler.

By using a fractionator as described in the present invention over that of conventional fractionators that are abruptly reduced in diameter, there is a smaller amount of heat required, the cost of manufacturing the column is reduced, and the efficiency is increased from about 60 to about 69 percent.

(2) Another use of the invention is to dehexanize lean oil that has been used to adsorb (by weight) 50 percent of the ethane, 99.9 percent of the propane, and 100 percent of the butane and heavier hydrocarbons from gas at −35° F. Rich gas is passed into the top of an adsorber; wherein gas denuded of gasoline is passed out as vapor; wherein rich oil is passed from said adsorber and discharged into the fractionator containing 37 trays. The same tower as described in Example 1 would be satisfactory for this service.

By using a fractionator as described in the present invention over that of conventional fractionators that are abruptly reduced in diameter, there is a smaller amount of heat required, the cost of manufacturing the column is reduced, and the efficiency is substantially increased.

(3) An additional use of this invention, although requiring a different size of separation vessel than used in Examples 1 or 2, is represented by a liquid-liquid separation containing integral extract and raffinate stages whereby a stream of liquid methyl carbonal descends through a rising stream of liquid isoprene and liquid isoamylene; the two streams are contacted through integral extract raffinate steps; wherein the isoamylene raffinate is withdrawn from the top; wherein the methyl carbonal and isoprene extract is withdrawn from the bottom.

(4) An additional use of this invention, although requiring a different size separation vessel than used in Example 1 or 2 is represented by a liquid-liquid separation containing integral extract and raffinate stages whereby a stream of liquid furfural descends through a rising stream of liquid cyclohexane and liquid 2,2-dimethyl pentane, or liquid cyclohexane and 2,4-dimethyl pentane; the two streams are contacted through integral extract raffinate steps; wherein the 2,2- or 2,4-dimethyl pentane raffinate is withdrawn from the top; wherein the furfural and cyclohexane extract is withdrawn from the bottom. The size of the vessel would depend on the purity required and the desired flow rate.

What is claimed is:

1. A fractional distillation column for separating components from a liquid mixture comprising:
  (a) a vertical, elongated column having a cylindrical lower section and an upper section which is generally shaped in the form of a truncated cone and having inclined walls;
  (b) conduit means for introducing a feed into said upper section;
  (c) means for vaporizing at least a portion of said feed;
  (d) vertically spaced, horizontal trays having perforations disposed in said upper and lower sections of said column so as to divide said column into a plurality of contact zones, the diameter of said upper section and the diameter of said trays progressively decreasing in the upward direction consistent with the theoretical tray area required to obtain an efficient separation of the vaporized components from the liquid mixture;
  (e) at least one conduit means extending through each of said trays and terminating in adjacent contacting zones through which liquid descends, every other tray in said upper section having conduit means arranged to direct the flow of the descending liquid parallel to the inclined walls of said upper section so as to obtain maximum contact of the descending liquid with the next subjacent tray;
  (f) means for removing separated vaporized components from the top portion of said section, means for condensing the removed vapor and means for recycling a portion of the condensed vapors to an intermediate point in the upper section of said column; and
  (g) means for removing liquid having the vaporized components separated therefrom from the bottom portion of said lower section.

References Cited
UNITED STATES PATENTS

| | | | |
|---|---|---|---|
| 2,056,789 | 10/1936 | Irwin et al. | 261—114 X |
| 2,070,100 | 2/1937 | Twomey | 261—114 X |
| 3,110,663 | 11/1963 | Miller | 196—115 X |
| 3,249,516 | 5/1966 | Mueller | 202—158 |

FOREIGN PATENTS

| | | |
|---|---|---|
| 863,594 | 1/1941 | France. |
| 899,222 | 7/1944 | France. |
| 768,316 | 2/1957 | Great Britain. |

RONALD R. WEAVER, *Primary Examiner.*